United States Patent [19]

Hamano

[11] Patent Number: 4,494,414

[45] Date of Patent: Jan. 22, 1985

[54] STARTER WITH A PLANETARY GEAR REDUCTION FACILITIES

[75] Inventor: Isao Hamano, Hyogo, Japan

[73] Assignee: Mitsubishi Denki Kabushiki Kaisha, Tokyo, Japan

[21] Appl. No.: 435,190

[22] Filed: Oct. 19, 1982

[30] Foreign Application Priority Data

Oct. 24, 1981 [JP] Japan ................. 56-160102[U]

[51] Int. Cl.³ ............... F02N 15/04; F16H 57/10; F16H 1/32

[52] U.S. Cl. ...................... 74/7 E; 74/411; 74/785; 74/801

[58] Field of Search ........... 74/7 E, 411, 785, 801

[56] References Cited

U.S. PATENT DOCUMENTS

| | | | |
|---|---|---|---|
| 1,040,867 | 10/1912 | Bradley | 74/801 X |
| 2,271,640 | 2/1942 | Heintz | 74/411 X |
| 3,079,814 | 3/1963 | Nickstadt | 74/785 |
| 4,075,910 | 2/1978 | Davis et al. | 74/785 |

Primary Examiner—Allan D. Herrmann
Attorney, Agent, or Firm—Sughrue, Mion, Zinn, Macpeak, and Seas

[57] ABSTRACT

A starter, which has a planetary gear reduction facilities for transmitting torque from a rotary shaft rotated by a D.C. motor to an output shaft which is connected to a pinion via an overrunning clutch for starring an internal combustion engine, has an elastic member which confronts a cylindrical ring gear. Confronting surfaces of the cylindrical ring gear and the elastic member have wave-like, concave and convex surfaces which engage each other and transmit torque, imposed on a planetary gear under high loads, to a flange and bracket of the starter, thus relieving high stresses imposed on the planetary gears under high load conditions.

6 Claims, 3 Drawing Figures

U.S. Patent     Jan. 22, 1985     4,494,414
FIG. 1 PRIOR ART
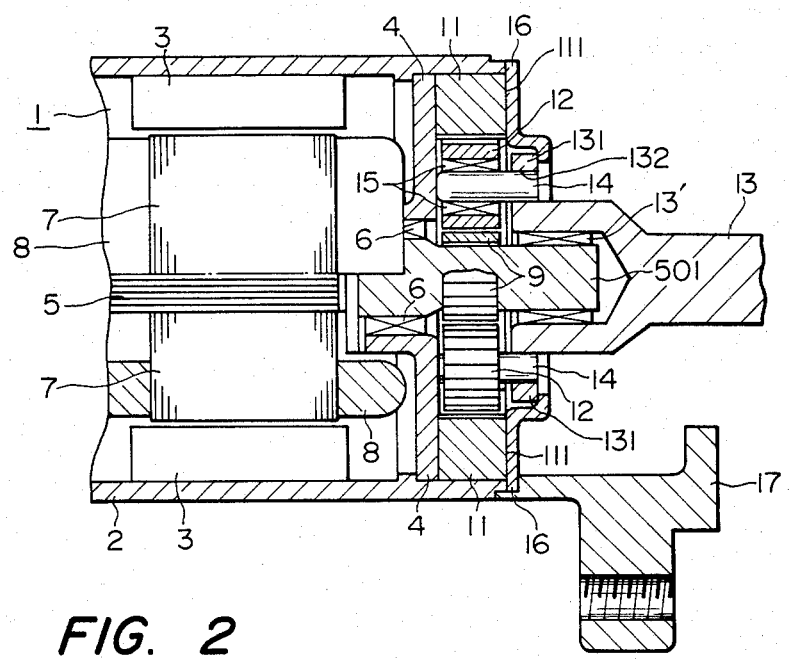
FIG. 2
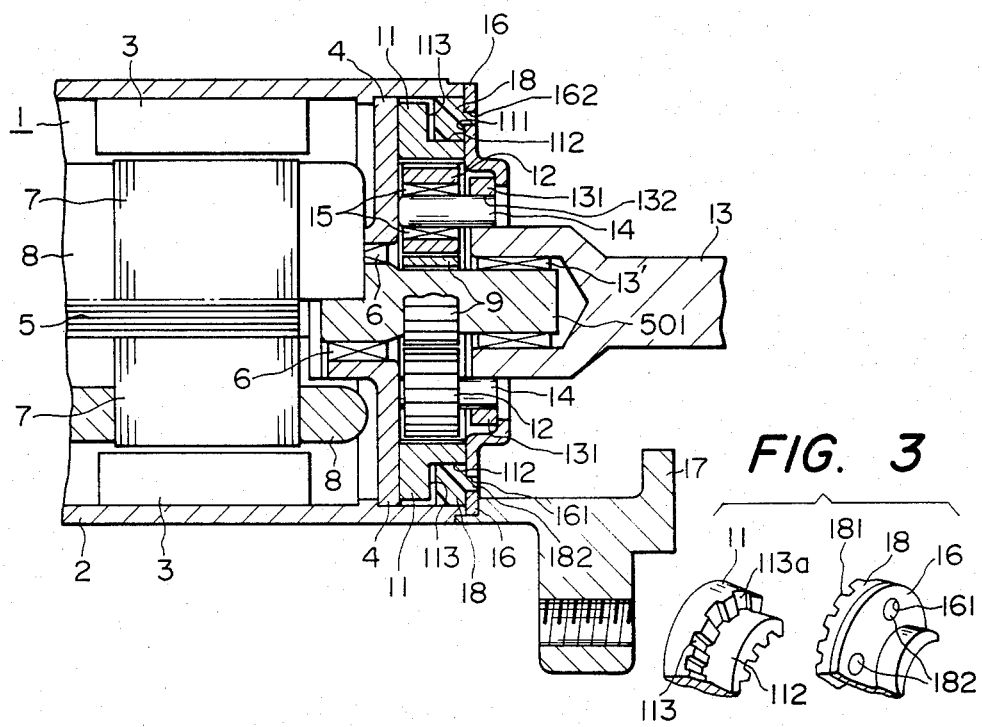
FIG. 3

STARTER WITH A PLANETARY GEAR REDUCTION FACILITIES

BACKGROUND OF THE INVENTION

1. Field of the Invention

The present invention relates to a starter with a planetary gear reduction facilities which is adapted to decrease an impact force that develops when an internal combustion engine is started.

2. Description of the Prior Art

FIG. 1 is a side view, partially in cross-section, showing a conventional starter with a planetary gear reduction facilities. In FIG. 1, a D.C. motor 1 for starting an internal combustion engine (not shown) includes a cylindrical yoke 2 which forms a magnetic path, and a ferrite permanent magnet member magnetic pole 3 which is fixed to an inner peripheral surface of the yoke 2. The magnetic pole 3 and the yoke 2 form a magnetic field means. The D.C. motor 1 also includes a flange 4 which closes an opened end of the yoke 2, and a rotary shaft 5 is rotatably supported by the flange 4 via a bearing 6. An armature 7 is mounted to the rotary shaft 5, and an armature winding 8 is applied to the rotary shaft which completes the construction of the D.C. motor 1.

In addition to the D.C. motor, the conventional starter contains a spur gear 9 which is fitted to a projected portion 501 of the rotary shaft 5, and the projected portion 501 extends outwards from the flange 4. A cylindrical gear 11, which has a gear on its inner peripheral surface, is rotatably mounted on an inner peripheral surface of the yoke 2 so that it is opposite the spur gear 9. Two planetary gears 12 engage the ring gear 11 and the spur gear 9, and these gears transfer torque between the ring gear and the spur gear. An output rotary shaft 13 is rotatably supported at the projected portion 501 of the rotary shaft 5 via a bearing 13', and it is provided with a collar-like portion 131. Pins 14 are fittedly inserted into holes 132 which are formed in the collar-like portion 131. The pins 14 rotatably support the planetary gears 12 via bearings 15. A flange 16 is in close contact with an end surface 111 of the ring gear 11, as well as with the yoke 2, so that the ring gear 11 is clasped between the flange 4 and the flange 16. In addition, the flange 16 is in contact with the outer surface of the collar 131 of the output rotary shaft 13 to prevent the output rotary shaft 13 from sliding to the right in FIG. 1. A front bracket 17 fixedly secures the yoke 2 and the flange 16.

The starter shown in FIG. 1 operates as follows: If an electric current is supplied to the armature winding 8, and a magnetic field is generated by the yoke 2 and the magnetic pole 3, a rotary power is generated which causes the rotary shaft 5 to rotate. Accordingly, the planetary gears 12 are rotated due to their engagement with the spur gear 9, and they undergo a planetary motion while simultaneously engaging the ring gear 11. Thus, the speed of rotation of the rotary shaft 5 is decelerated and transmitted to the output rotary shaft 13. An overrunning clutch (not shown) is spline-coupled to the output rotary shaft 13, and an internal combustion engine (not shown) is started by a rotation power of a pinion (not shown) which unidirectionally engages the overrunning clutch.

In use, the internal combustion engine (not shown) is stationary at the initial moment when it is engaged by the pinion. Hence, a lock torque is instantaneously generated in the D.C. motor at the time of the above-mentioned engagement. Thus, an impact load is generated in the power system which includes the D.C. motor and the various gears. Often, however, the planetary gear 12 does not have sufficient strength to withstand this impact load, and, accordingly, its reliability is poor.

SUMMARY OF THE INVENTION

An object of the present invention is to remove the above-mentioned drawbacks relating to the poor reliability of the planetary gear and to provide a starter with a planetary gear reduction facilities which is capable of absorbing the impact load imposed on it, thereby improving the reliability of the power system.

BRIEF DESCRIPTION OF THE DRAWINGS

FIG. 1 is a side view, partially in cross-section, showing a conventional starter with a planetary gear reduction facilities;

FIG. 2 is a side view, partially in cross-section, showing one embodiment of the starter with a planetary gear reduction facilities constructed in accordance with the present invention; and FIG. 3 is a disassembled, partial view of a ring gear and an elastic member which are shown in FIG. 2.

DESCRIPTION OF THE PREFERRED EMBODIMENTS

FIG. 2 is a side view, partially in cross-section, showing one embodiment of a starter with a planetary gear reduction facilities constructed in accordance with the present invention. FIG. 3 is a disassembled, partial view of a ring gear 11 and an elastic member 18 shown in FIG. 2. The elements shown in FIG. 2 which are the same as those shown in FIG. 1 are given identical reference numerals.

In FIG. 2, an annular groove 112 is formed on a surface of the ring gear 11 which contacts a flange 16, as shown in FIG. 2 and FIG. 3. Wave-like convexities and concavities 113a are formed on an end surface 113 of the annular groove 112, and an elastic member 18 is fitted into the annular groove 112. The elastic member 18 is provided with wave-like convexities and concavities 181 which engage similar wave-like convexities and concavities 113a of the ring gear 11, and it is also provided with projections 182 which are inserted into holes 161 formed in the flange 16. The ring gear 11 is clasped between the elastic member 18 and the flange 4. The elastic member 18 is made of an elastic material such as nylon.

According to the embodiment of FIG. 2, the reaction force of the rotation power, which is generated in the ring gear 11 by the rotation of the planetary gear 12 when the planetary gear 12 is rotated by the D.C. motor 1, is transmitted to the elastic member 18 via the wave-like convexities and concavities 113a, 181. The rotation power is then transmitted to the flange 16 and the front bracket 17 so that it is received there. In addition, when a high stress from an impact load is generated, as in the case when a pinion engages an internal combustion engine, the wave-like convexities and concavities 181 of the elastic member 18 become deformed so that the wave-like convexities and concavities 113a of the ring gear 11 rotate in such a way as to slide on the surface of the wave-like convexities and concavities 181, thereby reducing the high stress.

The elastic member 18 may comprise a spring-like elastic member which is made of a synthetic rubber, a synthetic resin, or a metal. The ring gear 11 is made of metal. It is possible to produce the ring gear 11 easily in accordance with a forging process or a powder press process. It is possible to produce the elastic member 18 quite easily in accordance with an injection molding process, thereby making it possible to manufacture the elastic member 18 inexpensively.

In accordance with the present invention, since the force which is transmitted to the ring gear 11 by the planetary gear 12 is received and transmitted to the elastic member via the wave-like convexities and concavities which are formed at the end surface of the elastic member, the abnormal stress which is imparted to the power system, such as an impact force or the like, is eased. Thus, the reliability of the strength of the starter is improved.

I claim:

1. A starter with a planetary gear reduction facilities, comprising:
   a motor (1) having a first rotary shaft (5) and a yoke (2);
   a spur gear (9) formed on said rotary shaft;
   a cylindrical ring gear (11) rotatably mounted on an inner peripheral surface of said yoke, an inner peripheral surface of said ring gear having gear teeth thereon;
   planetary gear means (12) engaged with said ring gear teeth and said spur gear;
   an output second rotary shaft (13), said second shaft having first means (131, 132) for supporting said planetary gear means, said first rotary shaft having second means (501, 13') for rotatably supporting said second shaft;
   a first flange (16) mounted to said yoke and engaged with said second shaft to prevent axial movement thereof;
   a second flange (4) mounted adjacent one end surface of said ring gear; and
   an elastic member (18) mounted between an opposite end surface of said ring gear and an end surface (111) of said first flange, said opposite end surface of said ring gear and an end surface of said elastic member having contacting wave-like convex and concave surfaces (113a, 181).

2. The starter as claimed in claim 1 wherein said elastic member has projections (182) which fit into corresponding holes (161) in said first flange.

3. The starter as claimed in claim 1 wherein said ring gear has an annular groove (112) in fitting contact with said elastic member, said wave-like concave and convex surface of said ring gear being formed on an end surface (113) of said annular groove.

4. The starter as claimed in claim 1 wherein said elastic member is made of an nylon material, a synthetic rubber, a synthetic resin, or a metal.

5. The starter as claimed in claim 1 wherein said concave and convex surface on said elastic member is formed so that said concave and convex surface on said ring gear rotates relative to said concave and convex surface on said elastic member when a high load is imposed on said planetary gear means.

6. The starter as claimed in claim 1 wherein said first supporting means comprises a collar-like portion (131) formed on said second shaft, said collar-like portion having holes (132) formed therein for accommodating pins (14) of said planetary gear means.

* * * * *